No. 744,765. PATENTED NOV. 24, 1903.
L. R. KEOGH.
PROCESS OF MAKING ALUMINA AND BY-PRODUCTS.
APPLICATION FILED AUG. 13, 1902.
NO MODEL. 2 SHEETS—SHEET 1.
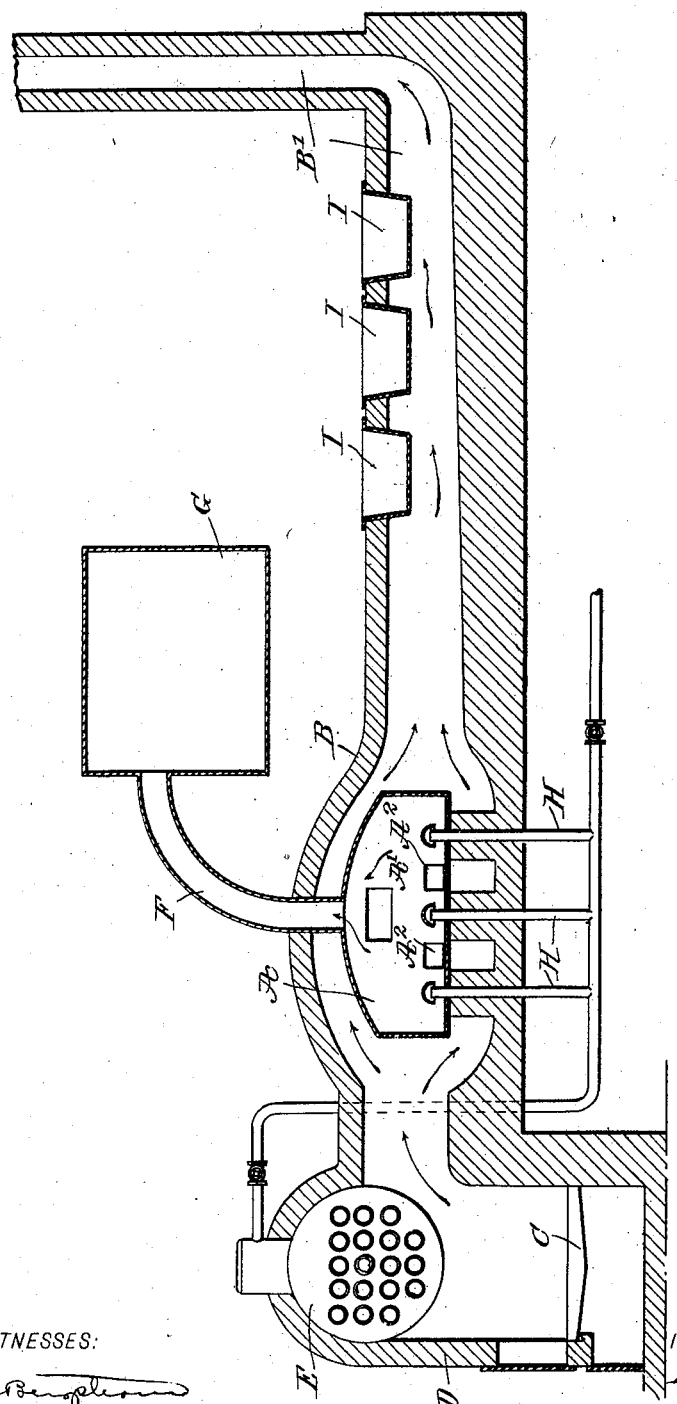
WITNESSES:
INVENTOR
Lucius R. Keogh
BY
ATTORNEYS.

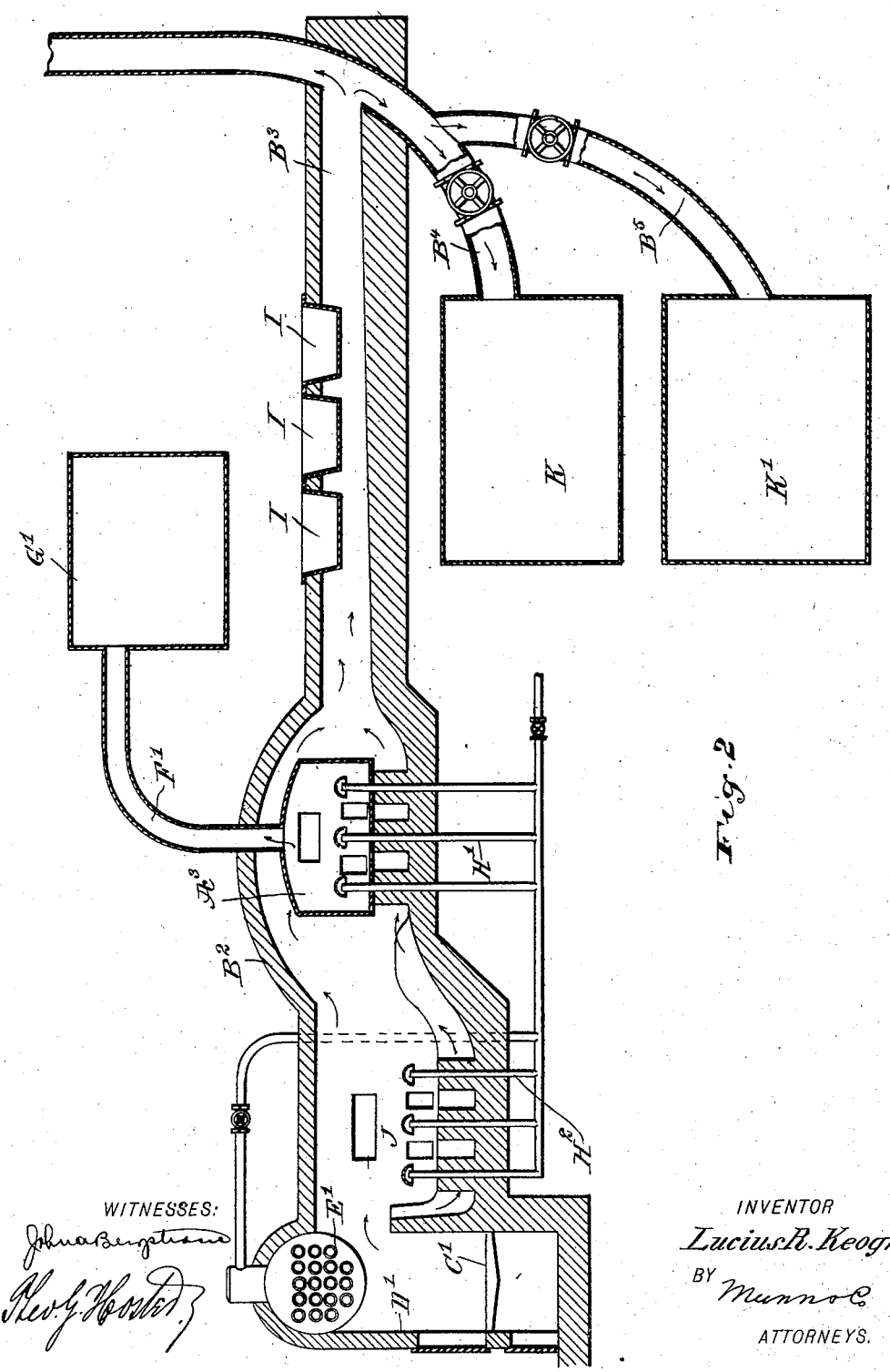

No. 744,765. Patented November 24, 1903.

UNITED STATES PATENT OFFICE.

LUCIUS RICHARD KEOGH, OF PEMBROKE, CANADA, ASSIGNOR OF ONE-THIRD TO NOAH JOSEPH GAREAU, OF PEMBROKE, CANADA.

PROCESS OF MAKING ALUMINA AND BY-PRODUCTS.

SPECIFICATION forming part of Letters Patent No. 744,765, dated November 24, 1903.

Application filed August 13, 1902. Serial No. 119,502. (No specimens.)

*To all whom it may concern:*

Be it known that I, LUCIUS RICHARD KEOGH, a subject of the King of Great Britain, and a resident of Pembroke, in the county of Renfrew, Province of Ontario, and Dominion of Canada, have invented new and useful Improvements in the Manufacture of Alumina and By-Products, of which the following is a full, clear, and exact description.

The object of the invention is to provide a new and improved process for the manufacture of alumina and by-products, such as hydrochloric acid, sodium sulfate, sodium aluminate, sodium carbonate, and other substances that may be contained in clay, kaolin, bauxite, or other aluminous ores, sulfate of aluminium, or other aluminous materials to be treated, and sodium chlorid.

The process consists, essentially, in mixing sulfate of aluminium with sodium chlorid and some water to form a thick pulp, then heating the latter and passing steam into the pulp to form a mixture of alumina and sodium sulfate and to evolve gaseous hydrochloric acid with steam, and finally separating the sodium sulfate from the alumina.

In carrying out the process I prefer to use an apparatus such as shown in the accompanying drawings, forming part of this specification, in which similar characters of reference indicate corresponding parts in both views.

Figure 1 is a sectional side elevation of the apparatus for treating comparatively pure sulfate of aluminium, and Fig. 2 is a like view of the apparatus for treating impure sulfate of aluminium.

The apparatus shown in Fig. 1 consists, essentially, of a vessel A, arranged in a brickwork B and heated from the products of combustion of the burning fuel held on the grate C of the furnace D, carrying a steam-boiler E. The brickwork is provided with an outlet-flue B'. The vessel A is connected by a pipe F with a condensation-chamber G, and into the vessel A extend the steam-pipes H, receiving their supply of steam from the boiler E. The vessel A is provided with a charging-door A' for placing the material to be treated into the vessel, and the latter is also provided with doors A² for removing the final product.

In detail I proceed as follows: Sulfate of aluminium, preferably hydrated sulfate of aluminium or hydrated acid sulfate of aluminium of the formula $Al_2(SO_4)_3.16H_2O$, and sodium chlorid in a quantity equivalent chemically to the sulfuric acid contained in the sulfate of aluminium are thoroughly mixed with some water to form a pulp, which is placed in the vessel A and gradually heated therein to about 200° to 300° centigrade, and at the same time steam is passed into the pulp by the pipes H, so that hydrochloric acid is formed, which passes with the steam through the pipe F to the condensation-chamber G to be condensed therein, while alumina and sodium sulfate settle in the vessel A and are removed from the same to suitable washing-tanks to dissolve the sodium sulfate out of the alumina. In case the acid sulfate of aluminium having sixteen molecules of water of hydration is treated as described then the chemical reaction that takes place in the vessel A is as follows:

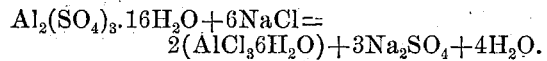
$$Al_2(SO_4)_3.16H_2O+6NaCl= \\ 2(AlCl_36H_2O)+3Na_2SO_4+4H_2O.$$

The $AlCl_36H_2O$ breaks down at once.

For the preparation of anhydrous alumina and sodium sulfate I prefer to use a sulfate of alumina as free from impurities as can readily be obtained; but for the preparation of the hydrated alumina in the first stage of the process, as well as for the preparation of sodium aluminate or sodium carbonate, it is not essential that the sulfate of alumina be particularly pure. The sulfate of alumina may be treated in two ways, according to the products desired to be formed and according to the purity of the said sulfate. In either case it is first mixed with the sodium chlorid, which I prefer to use as pure as can be conveniently obtained, for more or less calcium sulfate or potassium chlorid is apt to be present and to affect the quality of the products formed by giving rise to potassium sulfate, potassium carbonate, and calcium chlorid or calcium sulfate in the products. The sodium chlorid is added in a quantity equivalent chemically to the sulfuric acid combined with the alumina and also contained in the impurities present in the sulfate of aluminium, such as sulfates of iron, and the sodium chlorid and the sulfate of aluminium, together with the impurities contained therein, are thoroughly and intimately mixed. This may be done to advantage by adding the sodium chlorid to the sulfate of aluminium in solution just before evaporation is completed or by mixing the two together with a limited quantity of water and evaporating to such a degree of dryness as will enable the mixture to be readily subjected to the next stage in the vessel A; but care must be taken that the temperature does not rise above about 100° centigrade during this stage of the process. The evaporation referred to may be accomplished in shallow leaden pans I, set in the outlet-flue B', to be heated by the waste heat from the fire-box D. The mixture of sodium chlorid and sulfate of aluminium is then shoveled into the vessel A, to be treated as described.

In case the sulfate of aluminium is impure the mixture must be mixed with a sufficient quantity of carbonaceous matter, such as charcoal-dust or coal-dust, to reduce the sulfates formed to sulfids. The amount of the carbonaceous matter is calculated and added during the evaporation of the mixture in the leaden pans, or it may be added afterward and ground up with the mixture of sodium chlorid and sulfate of aluminium before this mixture is placed into the vessel $A^3$.

It is understood that more or less steam is passed through the pipe H into the vessel A, according to the amount of combined water in the sulfate of aluminium, it being understood that the less of such water the more steam is required until all the hydrochloric acid is expelled.

In case impurities, such as sulfates of iron, are in the sulfate of aluminium then the apparatus shown in Fig. 2 is preferably employed, which apparatus consists of a vessel $A^3$, arranged in the brickwork $B^2$, having an outlet-flue $B^3$, and the said vessel $A^3$ is heated by the products of combustion from the burning fuel on a grate C' in a fire-box D', having a steam-boiler E' for supplying steam by the pipes H' to the vessel $A^3$ and for supplying steam by the pipes $H^2$ to the reverberatory furnace-hearth J, arranged in the brickwork $B^2$ between the fire-box D' and the vessel $A^3$. A pipe F' connects the vessel $A^3$ with a condensation-chamber G', and the flue $B^3$ connects by valved branch pipes $B^4$ $B^5$ with combustion-chambers K and K'. The reaction in the vessel $A^3$ in addition to that occurring in the vessel A is as follows:

$$Fe_2(SO_4)_3 + XH_2O + 6NaCl =$$
$$2(FeCl_3.6H_2O) + 3Na_2SO_4 + (X-12)H_2O,$$

or $$FeSO_4.7H_2O + 2NaCl =$$
$$FeCl_2.4H_2O + Na_2SO_4 + 3H_2O.$$

The hydrated chlorids, the aluminium, and all iron, if any, are then decomposed as follows by the action of heat in the vessel $A^3$:

$$2(AlCl_3.6H_2O) = Al_2O_3 + 6HCl + 9H_2O,$$
$$2(FeCl_3.6H_2O) = Fe_2O_3 + 6HCl + 9H_2O,$$
$$FeCl_2.4H_2O = FeO + 2HCl + 3H_2O.$$

When the sulfate of aluminium is impure and it is desired to remove the iron oxid, then the resultant mass from the vessel A is transferred to the reverberatory furnace J, in which the temperature of the mass is raised to a red heat and into which furnace jets of steam are introduced by the pipes $H_2$ to come in contact with the mass whenever required. The carbonaceous matter present at the temperature mentioned reduces the sulfate of sodium to sulfid of sodium, which with the oxid of iron in the presence of alumina and steam forms sodium aluminate and sulfid of iron. Thus, $$Fe_2O_3 + 6Na_2SO_4 + Al_2O_3 + 24C =$$
$$Fe_2O_3 + 6Na_2S + Al_2O_3 + 24CO = Fe_2S_3 + Al_2O_3.3Na_2O + 3Na_2S.$$

There may be an excess of sodium sulfid, depending upon the amount of oxid of iron present. Any excess of such sodium sulfid may be converted into caustic soda, and so into sodium aluminate, if there is enough alumina present to combine with it by passing a jet of hot steam through and over the charge. The reaction is as follows:

$$Na_2S + 2H_2O = 2NaOH + H_2S,$$

or $$Al_2O_3 + Na_2S + H_2O = Al_2O_3.Na_2O + H_2S,$$

in case there be any alumina at this stage free to combine with the caustic soda. Now the mixture of sodium aluminate and impurities, sulfid of iron, &c., is lixiviated, and the aluminate of soda and excess of caustic, if any, are recovered. The alumina may now be precipitated from this solution in hydrated form in any of the ways usually employed in making alumina by means of sodium aluminate; but it is best, too, if the caustic be in excess and when it is not desired to use the caustic over again to precipitate the solution by means of carbon-dioxid gas, thus forming carbonate of soda, as well as hydrated alumina, both of which can now be recovered in any of the usual ways in common use in the art. The carbon dioxid needed for this purpose can be obtained by igniting the carbon monoxid formed in reducing the sulfate of sodium to sulfid of sodium by means of the carbonaceous material used in the charge.

The sulfureted hydrogen formed in the furnace may be ignited to sulfur or to sulfur dioxid and recovered. Any sulfid of sodium remaining in solution may be got rid of by crystallizing the carbonate of soda from the lye, which should be concentrated by evaporation after the precipitated alumina is removed.

It is understood that other substances besides those described may be used and allied reactions may take place without deviating from my invention. For instance, basic sulfates of aluminium, also anhydrous acid sulfate of aluminium, may be used with steam, and sodium chlorid and chlorid of potash may be used instead of chlorid of sodium.

Sulfates of iron and sodium chlorid may be used to form hydrochloric acid, sodium sulfate, and oxid of iron. Magnesium sulfate and sodium chlorid may be employed with water of crystallization or steam to form sodium sulfate and either magnesium chlorid or magnesium oxid and hydrochloric acid.

Having thus described my invention, I claim as new and desire to secure by Letters Patent—

1. The herein-described process for the manufacture of alumina and by-products, consisting in mixing sulfate of aluminium with sodium chlorid and some water, to form a thick pulp, then heating the latter to a temperature of from 200° to 300° centigrade and simultaneously passing steam into the pulp to form a mixture of alumina and sodium sulfate and to evolve gaseous hydrochloric acid with the steam, and finally separating the alumina and sodium sulfate, as set forth.

2. The herein-described process for the manufacture of alumina compounds and by-products, consisting in subjecting a mixture of sulfate of aluminium containing sulfate of iron, sodium chlorid and carbonaceous material to the action of heat and steam, to evolve gaseous hydrochloric acid with the steam, and to form a mixture of alumina, sodium sulfate and iron oxid, and then raising the temperature of the latter mixture to a red heat in a reverberatory furnace, as set forth.

3. The herein-described process for the manufacture of alumina compounds and by-products, consisting in subjecting a mixture of sulfate of aluminium containing sulfate of iron, sodium chlorid and carbonaceous material to the action of heat and steam, to evolve gaseous hydrochloric acid with the steam, and to form a mixture of alumina, sodium sulfate and iron oxid, then raising the temperature of the latter mixture to a red heat in a reverberatory furnace, and simultaneously applying steam, as set forth.

4. The herein-described process for the manufacture of alumina and by-products, consisting in mixing sulfate of aluminium containing sulfate of iron with sodium chlorid, carbonaceous matter and some water, to form a thick pulp, then heating the latter and simultaneously passing steam into the pulp to form a mixture of alumina and sodium sulfate and iron oxid and to evolve gaseous hydrochloric acid with the steam then raising the temperature of the mixture to red heat in the presence of steam to produce sodium aluminate and sulfid of iron, then lixiviating the mixture of sodium aluminate and sulfid of iron, and finally precipitating the alumina in hydrated form, as set forth.

5. The herein-described process for the manufacture of alumina and by-products, consisting in mixing sulfate of aluminium with sodium chlorid in a quantity equivalent chemically to the sulfuric acid contained in the sulfate of aluminium, then gradually heating the mixture to about 200° to 300° centigrade and subjecting the mixture to the action of steam to evolve gaseous hydrochloric acid mixed with the steam, and to form a mixture of alumina and sodium sulfate, then condensing the hydrochloric acid and steam, and separating the alumina and sodium sulfate by dissolving the latter out of the alumina, as set forth.

6. The herein-described process for the manufacture of alumina and by-products, consisting in mixing hydrated sulfate of alumina with sodium chlorid in a quantity equivalent chemically to the sulfuric acid contained in the hydrated sulfate of alumina, then gradually heating the mixture to about 200° to 300° centigrade to evolve gaseous hydrochloric acid and to form a mixture of alumina and sodium sulfate, then condensing the hydrochloric acid, and separating the alumina and sodium sulfate by dissolving the latter out of the alumina as set forth.

7. The herein-described process for the manufacture of alumina and by-products, consisting in mixing sulfate of aluminium with sodium chlorid and some water, to form a thick pulp, then heating the latter to form a mixture of alumina and sodium sulfate and to evolve gaseous hydrochloric acid and finally separating the alumina and sodium sulfate, as set forth.

8. The herein-described process for the manufacture of alumina and by-products, consisting in mixing sulfate of aluminium with sodium chlorid and some water to form a thick pulp, then heating the latter and simultaneously passing steam into the pulp to form a mixture of alumina and sodium sulfate and to evolve gaseous hydrochloric acid with the steam, and finally separating the alumina and sodium sulfate, as set forth.

9. The herein-described process for the manufacture of alumina and by-products, consisting in mixing sulfate of aluminium with sodium chlorid in a quantity equivalent chemically to the sulfuric acid contained in the sulfate of aluminium, then gradually heating the mixture and subjecting the mixture to the action of steam to evolve gaseous hydrochloric acid mixed with the steam and to form a mixture of alumina and sodium sulfate, then condensing the hydrochloric acid and steam and separating the alumina and sodium sulfate by dissolving the latter out of the alumina, as set forth.

10. The herein-described process for the manufacture of alumina and by-products, consisting in mixing hydrated aluminium sulfate with sodium chlorid in a quantity equivalent chemically to the sulfuric acid contained in the hydrated sulfate of aluminium, then gradually heating the mixture to evolve gaseous hydrochloric acid and to form a mixture of alumina and sodium sulfate, then condensing the hydrochloric acid and separating the alumina and sodium sulfate by dissolving the latter out of the alumina, as set forth.

11. The herein-described process for the manufacture of alumina and by-products, consisting in mixing sulfate of aluminium containing sulfate of iron with sodium chlorid, carbonaceous matter and some water, to form a thick pulp, then heating the latter and simultaneously passing steam into the pulp to form a mixture of alumina and sodium sulfate and iron oxid and to evolve gaseous hydrochloric acid with the steam, then raising the temperature of the mixture to a red heat to produce sodium aluminate and sulfid of iron, then lixiviating the mixture of sodium aluminate and sulfid of iron, and finally precipitating the alumina in hydrated form, as set forth.

12. The herein-described process for the manufacture of alumina compounds and by-products, consisting in subjecting a mixture of sulfate of aluminium containing compounds of iron, sodium chlorid and carbonaceous material to the action of heat and steam, to evolve gaseous hydrochloric acid with the steam, and to form a mixture of alumina, sodium sulfate and iron oxid, and then raising the temperature of the latter mixture to a red heat in a reverberatory furnace, as set forth.

13. The herein-described process for the manufacture of alumina compounds and by-products, consisting in subjecting a mixture of alum cake and sodium chlorid and carbonaceous material to the action of heat and steam to evolve gaseous hydrochloric acid with the steam and to form a mixture of alumina, sodium sulfate and impurities, then raising the temperature of the latter mixture to a red heat in a reverberatory furnace, as set forth.

14. The herein-described process for the manufacture of alumina compounds and by-products, consisting in subjecting a mixture of alum cake, compounds of iron, sodium chlorid and carbonaceous material to the action of heat and steam to evolve gaseous hydrochloric acid with the steam and to form a mixture of alumina, sodium sulfate and impurities with iron oxid, then raising the temperature of the latter mixture to a red heat in a reverberatory furnace, as set forth.

In testimony whereof I have signed my name to this specification in the presence of two subscribing witnesses.

LUCIUS RICHARD KEOGH.

Witnesses:
ELIZABETH GILLIES,
HARRY DURRAND.